US008763783B2

(12) United States Patent
Ballarotti

(10) Patent No.: US 8,763,783 B2
(45) Date of Patent: Jul. 1, 2014

(54) WORKING UNIT WITH LABELLING MACHINE AND MACHINE FOR FILLING CONTAINERS

(75) Inventor: Mario Ballarotti, Marmirolo (IT)

(73) Assignee: P.E. Labellers S.p.A., Porto Mantovano (IT)

( * ) Notice: Subject to any disclaimer, the term of this patent is extended or adjusted under 35 U.S.C. 154(b) by 0 days.

(21) Appl. No.: 13/520,670

(22) PCT Filed: Dec. 20, 2010

(86) PCT No.: PCT/EP2010/070308
§ 371 (c)(1),
(2), (4) Date: Jul. 5, 2012

(87) PCT Pub. No.: WO2011/083039
PCT Pub. Date: Jul. 14, 2011

(65) Prior Publication Data
US 2012/0285803 A1 Nov. 15, 2012

(30) Foreign Application Priority Data
Jan. 8, 2010 (IT) .............................. MI2010A0011

(51) Int. Cl.
*B65G 47/26* (2006.01)

(52) U.S. Cl.
USPC ..................................... 198/459.2; 198/459.8

(58) Field of Classification Search
USPC ........................................... 198/459.2, 459.8
See application file for complete search history.

(56) References Cited

U.S. PATENT DOCUMENTS

| | | | | |
|---|---|---|---|---|
| 1,985,897 | A * | 1/1935 | Huntar | 198/459.2 |
| 2,007,981 | A * | 7/1935 | Nordquist | 198/459.2 |
| 2,026,811 | A * | 1/1936 | Bach | 198/459.2 |
| 2,292,400 | A * | 8/1942 | Nordquist | 198/459.2 |
| 2,621,841 | A * | 12/1952 | Simpson | 198/459.8 |
| 6,436,330 | B1 | 8/2002 | Winter | |
| 7,055,671 | B2 * | 6/2006 | De Guglielmo et al. | 198/419.2 |
| 7,500,338 | B2 * | 3/2009 | Spatafora et al. | 198/459.2 |
| 7,581,635 | B2 * | 9/2009 | Lecomte | 198/459.4 |
| 2002/0112939 | A1 * | 8/2002 | Sumi et al. | 198/459.2 |

FOREIGN PATENT DOCUMENTS

| | | | |
|---|---|---|---|
| DE | 103 25 693 | A1 | 7/2004 |
| DE | 10 2006 023531 | A1 | 11/2007 |

* cited by examiner

*Primary Examiner* — James R Bidwell
(74) *Attorney, Agent, or Firm* — Greer, Burns & Crain Ltd.

(57) ABSTRACT

A working unit comprising a container labelling machine and a machine for filling such containers, the working unit comprising a variable-spacing element, which is interposed between the machines in order to convey the containers that exit from the first machine encountered in the production line to the inlet of the second machine, changing the spacing of the containers according to the operational conditions.

1 Claim, 1 Drawing Sheet

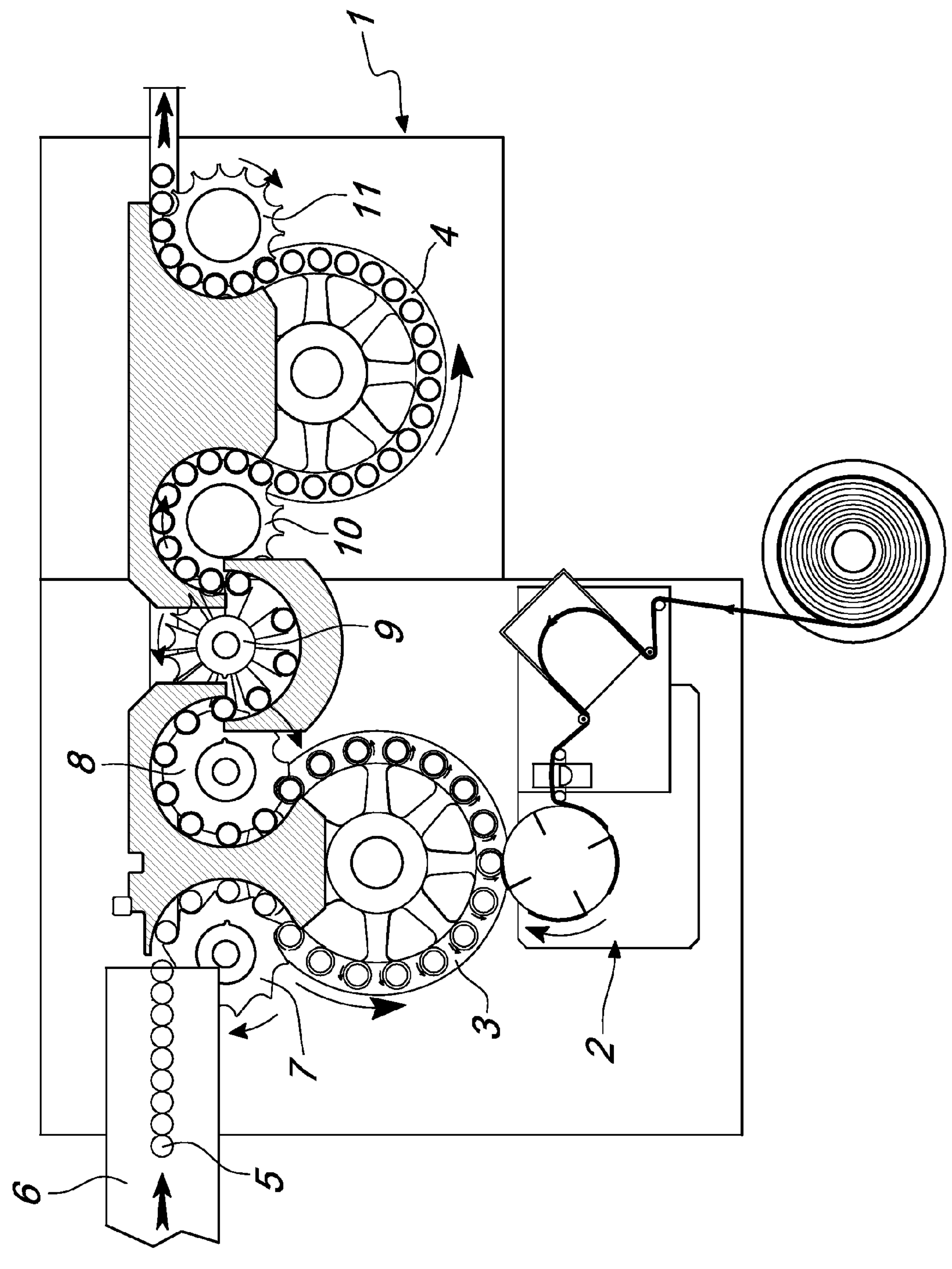
1
11
4
10
9
8
7
3
2
5
6

WORKING UNIT WITH LABELLING MACHINE AND MACHINE FOR FILLING CONTAINERS

The present invention relates to a working unit comprising a container labelling machine and a machine for filling such containers.

BRIEF DESCRIPTION OF THE DRAWINGS

It is known that in machines for filling containers with liquid products, which usually comprise a rotating carousel for supporting the individual containers, it is possible to arrange the containers during filling thereof on the carousel at a minimum mutual distance, and thereby the circumstance arises that the distance between the axes of two contiguous containers, known as spacing, can be reduced to a dimension that is not much more than the diameter of the containers proper.

Obviously, advantage is taken of this circumstance in the construction of such filling machines, and thus, when having to devise a filling machine designed to handle containers which have a certain maximum diameter, the designers select a spacing that is only a little greater than such diameter, because in this way they achieve two important outcomes, i.e. significant cost savings and reduction of volumes.

Therefore, considering the great variety of containers present on the market of liquid products, there is a considerable number of types of filling machines, each provided with a different spacing value.

It is immediately evident that, for reasons of cost, if working units are to be manufactured that comprise a labelling machine and a filling machine in series, it would not be an economical proposition to install, for each type of filling machine, a labelling machine that is dedicated thereto in terms of the spacing value, and therefore the aim of the present invention is to provide a working unit of the type described above in which it is possible to adopt just one type of labelling machine whatever the spacing of the filling machine is, at least within a certain range.

SUMMARY OF THE INVENTION

This aim is achieved by a working unit according to the invention, characterised in that it comprises the features disclosed in the appended claims.

BRIEF DESCRIPTION OF THE DRAWINGS

Further characteristics and advantages of the working unit according to the invention will become better apparent from the description of a preferred, but not exclusive, embodiment thereof, illustrated by way of non-limiting example in the accompanying drawing which shows, in schematic form, a partial plan view of the working unit of the present invention.

DESCRIPTION OF THE PREFERRED EMBODIMENTS

With reference to the FIGURE, the reference numeral 1 generally indicates a working unit according to the invention which comprises, in series, a labelling machine 2 provided with a rotating carousel 3, and a filling machine of which only carousel 4, which is designed to support the containers during filling, is shown.

Containers 5 which are conveyed by an air belt 6 and are suitably spaced according to the spacing that characterises the labelling machine 2 come to be supported on the carousel 3 of the machine by means of an intake star wheel 7 and, after having been labelled, arrive at an exit star wheel 8 still spaced according to the spacing conferred on them.

At this point the containers are handled by a variable-spacing star conveyor 9 which changes the spacing of the containers, in this case reducing it in a manner clearly shown in the figure, in order to convey the containers to an intake star wheel 10 of the filling machine which will handle the placing of the containers on the carousel 4 of such machine, with the spacing that characterises its functioning, up to an exit star wheel 11.

In the construction of different models of the working unit according to the invention that are designed to handle containers that have different diameters and which therefore require the adoption of filling machines with different spacings, it is possible to install a labelling machine provided with a well-determined spacing, which is changed by means of the variable-spacing star conveyor 9 so as to bring it to the value that characterises the functioning of the filling machine.

The invention, thus described, is susceptible of numerous modifications and variations, all of which are within the scope of the appended claims: thus for example the two machines, labelling and filling, can be arranged in an order that is inverted with respect to that described, and moreover the variable-spacing star conveyor can be substituted by any equivalent element.

The disclosures in Italian Patent Application No. MI2010A000011 from which this application claims priority are incorporated herein by reference.

The invention claimed is:

1. A working unit comprising a container labelling machine and a filling machine for filling said containers that are arranged in series with said container labeling machine being positioned upstream of said filling machine, and a variable-spacing star conveyor, which is interposed between an exit star wheel of said labeling machine and an intake star wheel of said filling machine and is adapted to convey the containers that exit from said labeling machine to the inlet of said filling machine, reducing the spacing of said containers so as to make it adapted for correct operation of said filling machine.

* * * * *